United States Patent
Suesada et al.

(10) Patent No.: US 9,473,212 B2
(45) Date of Patent: Oct. 18, 2016

(54) WIRELESS POWER TRANSMISSION SYSTEM

(71) Applicant: MURATA MANUFACTURING CO., LTD., Nagaokakyo-Shi, Kyoto-fu (JP)

(72) Inventors: Tsuyoshi Suesada, Nagaokakyo (JP); Kazuya Kato, Nagaokakyo (JP); Hironobu Takahashi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 477 days.

(21) Appl. No.: 14/108,541

(22) Filed: Dec. 17, 2013

(65) Prior Publication Data

US 2014/0175906 A1    Jun. 26, 2014

Related U.S. Application Data

(63) Continuation of application No. PCT/JP2012/078113, filed on Oct. 31, 2012.

(30) Foreign Application Priority Data

May 9, 2012    (JP) .................................. 2012-107388

(51) Int. Cl.
*H04B 5/00* (2006.01)
*H02J 17/00* (2006.01)
(Continued)

(52) U.S. Cl.
CPC ........... *H04B 5/0037* (2013.01); *G06F 1/1656* (2013.01); *G06F 1/263* (2013.01); *H02J 7/025* (2013.01); *H02J 17/00* (2013.01); *H02J 50/05* (2016.02); *H04B 5/0012* (2013.01)

(58) Field of Classification Search
CPC .. B60L 5/005; B60L 11/005; B60L 11/1809; B60L 11/1811; B60L 11/1812; H02J 5/00; H02J 7/025; H02J 50/00; H02J 50/05; H04B 5/0012; H04B 5/0037; Y02T 10/7072; Y02T 90/10; Y02T 90/12
USPC ....................................................... 307/104
See application file for complete search history.

(56) References Cited

U.S. PATENT DOCUMENTS 8,242,638 B2    8/2012    Camurati et al.
8,476,789 B2    7/2013    Ichikawa et al.
(Continued)

FOREIGN PATENT DOCUMENTS

CN    102299672 A    12/2011
FR    2 875 939 A1    3/2006
(Continued)

OTHER PUBLICATIONS

International Search Report and Written Opinion of the International Searching Authority for PCT/JP2012/078113 mailed Feb. 12, 2013.

*Primary Examiner* — Levi Gannon
(74) *Attorney, Agent, or Firm* — Arent Fox LLP

(57) ABSTRACT

In a power transmitter device, a power transmitter side active electrode and a power transmitter side passive electrode are formed. In a power receiver device, a power receiver side active electrode and a power receiver side passive electrode are formed. The power transmitter side active electrode is rectangle that is shorter in a first direction and longer in a second direction. The power receiver side active electrode is rectangle that is longer in the first direction and shorter in the second direction. The power transmitter side active electrode and the power receiver side active electrode are formed so as that lengths of overlapping area in the first and second directions do not change in a placement receivable area on the power transmitter device, within which the power receiver device is allowed to be displaced.

19 Claims, 15 Drawing Sheets

(51) Int. Cl.
*H02J 7/02* (2016.01)
*G06F 1/16* (2006.01)
*G06F 1/26* (2006.01)

(56) References Cited

U.S. PATENT DOCUMENTS

| | | | |
|---|---|---|---|
| 2005/0237691 A1* | 10/2005 | Dayan | G06F 1/26 361/119 |
| 2011/0163827 A1 | 7/2011 | Kanno et al. | |
| 2011/0316353 A1* | 12/2011 | Ichikawa | H02J 7/0044 307/149 |
| 2012/0025628 A1* | 2/2012 | Ichikawa | H02J 7/0044 307/104 |
| 2012/0038218 A1 | 2/2012 | Ichikawa | |
| 2012/0049640 A1 | 3/2012 | Ichikawa et al. | |
| 2012/0286742 A1 | 11/2012 | Ichikawa et al. | |
| 2013/0234533 A1* | 9/2013 | Kato | H02J 17/00 307/104 |
| 2014/0015337 A1* | 1/2014 | Takeuchi | G06F 1/1626 307/104 |
| 2014/0247097 A1 | 9/2014 | Kanno et al. | |

FOREIGN PATENT DOCUMENTS

| | | |
|---|---|---|
| JP | H10-032424 | 2/1998 |
| JP | 2009-531009 A | 8/2009 |
| JP | 2012-050314 A | 3/2012 |
| JP | 2012-070574 A | 4/2012 |
| JP | 2012-095505 A | 5/2012 |
| WO | 2010/035879 A1 | 4/2010 |
| WO | 2011/093438 A1 | 8/2011 |

* cited by examiner

FIG. 5
(A)
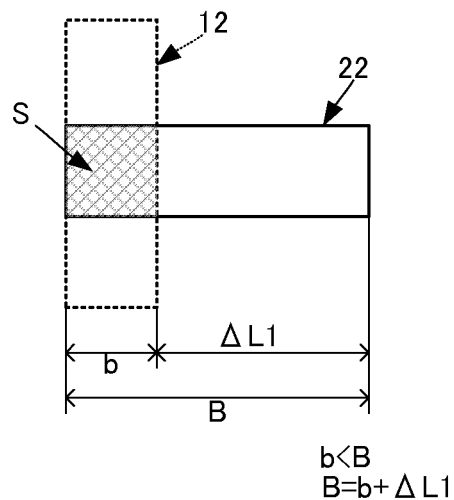
(B)
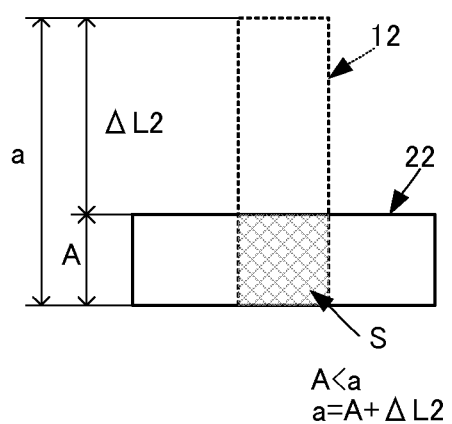

FIG. 13
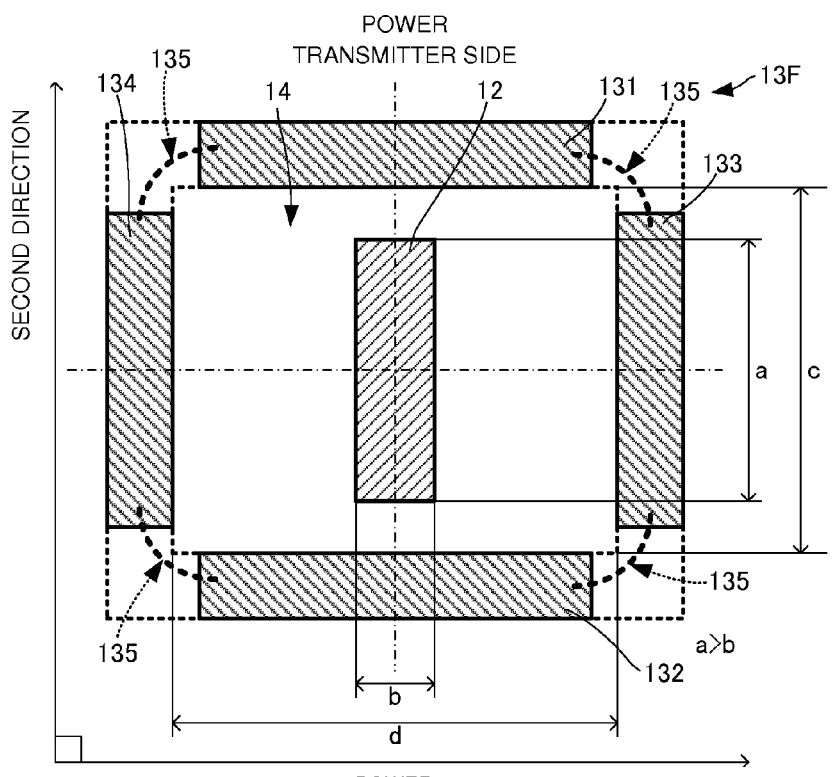
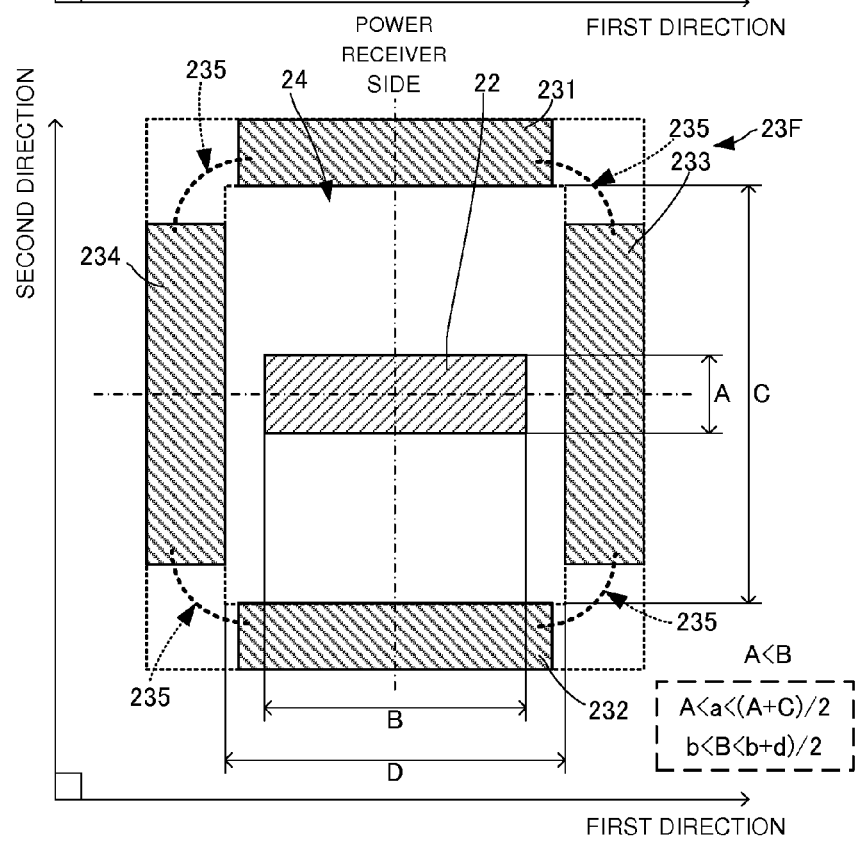

PRIOR ART

US 9,473,212 B2

WIRELESS POWER TRANSMISSION SYSTEM

CROSS REFERENCE TO RELATED APPLICATIONS

The present application is a continuation of PCT/JP2012/078113 filed Oct. 31, 2012, which claims priority to Japanese Patent Application No. 2012-107388, filed May 9, 2012, the entire contents of each of which are incorporated herein by reference.

FIELD OF THE INVENTION

The present invention relates to a wireless power transmission system that transmits electric power from a power transmitter device to a power receiver device without wiring between the power transmitter device and the power receiver device.

BACKGROUND OF THE INVENTION

In prior art, magnetic field coupling type power transmission systems and electric field coupling type power transmission systems have been developed as wireless power transmission systems.

The magnetic field coupling type power transmission system includes a power transmitter device and a power receiver device, each of which includes a coil. In the magnetic field coupling type power transmission system, electric power is transmitted from the power transmitter device to the power receiver device by forming magnetic field coupling between the power transmitter side coil and the power receiver side coil.

The electric field coupling type power transmission system also includes a power transmitter device and a power receiver device, each of which includes a coupling electrode. In the electric field coupling type power transmission system, electric power is transmitted from the power transmitter device to the power receiver device by forming electric field coupling between the power transmitter side coupling electrode and the power receiver side coupling electrode, namely, by forming a capacitor including the power transmitter side coupling electrode and the power receiver side coupling electrode to transmit a high-frequency high-voltage signal through the capacitor.

The electric field coupling type power transmission system has the advantage that electric power may be transmitted from the power transmitter device to the power receiver device even when a relative spatial relationship between the power transmitter side coupling electrode and the power receiver side coupling electrode does not accurately satisfy a specific condition, compared to the case with the magnetic field coupling type where a relative spatial relationship between the power transmitter side coil and the power receiver side coil needs to be satisfied accurately.

An example of the electric field coupling type power transmission system described above is described in Patent Document 1, and includes a configuration of FIG. 15 as a basic configuration.

FIG. 15 is a diagram illustrating the basic configuration of a typical electric field coupling type power transmission system identical to the power transmission system described in Patent Document 1. The typical electric field coupling type power transmission system includes a power transmitter device 10 and a power receiver device 20. The power transmitter device 10 includes a high-frequency high-voltage generator circuit 11, a power transmitter side active electrode 12, and a power transmitter side passive electrode 13. The high-frequency high-voltage generator circuit 11 is connected to the power transmitter side active electrode 12 and the power transmitter side passive electrode 13.

The power receiver device 20 includes a high-frequency high-voltage load circuit 21, a power receiver side active electrode 22, and a power receiver side passive electrode 23.

When transmitting electric power from the power transmitter device 10, the power receiver device 20 is arranged on the transmitter device 10 in such a way that the power receiver side active electrode 22 overlaps with the power transmitter side active electrode 12 with a predetermined gap 4 in between them so as to have an overlapping area equal to or larger than a predetermined area. Furthermore, the receiver device 20 is arranged on the transmitter device 10 so as that part of the power receiver side passive electrode 23 also overlaps with the power transmitter side passive electrode 13 with the predetermined gap 4 in between them.

In the electric field coupling type power transmission system having the configuration of FIG. 15, power transmission efficiency is greatly affected by an overlapping area between the power transmitter side active electrode 12 and the power receiver side active electrode 22. The power transmission efficiency becomes higher as the overlapping area between the power transmitter side active electrode 12 and the power receiver side active electrode 22 becomes larger. The power transmission efficiency becomes lower as the overlapping area between the power transmitter side active electrode 12 and the power receiver side active electrode 22 becomes smaller. Thus, it is necessary to keep the overlapping area equal to or larger than a predetermined value all the time in order to achieve predetermined power transmission efficiency.

Patent Document 1: Japanese Unexamined Patent Application Publication (Translation of PCT Application) No. 2009-531009

However, in the foregoing example in which, for example, the power receiver device 20 is placed on a top surface of the power transmitter device 10 without wiring the power receiver device 20 to the power transmitter device 10, the relative spatial relationship between the power transmitter device 10 and the power receiver device 20 is not always the same in a precise manner. The relative spatial relationship between the power transmitter side active electrode 12 and the power receiver side active electrode 22 may vary in some cases.

For example, when the power receiver device 20 formed of a rectangular housing is placed on the power transmitter device 10 such as a table, etc., to transmit electric power, a position of the power receiver device 20 on the power transmitter device 10 may vary two dimensionally in a plane perpendicular to a placing direction.

This two-dimensional variation in the relative spatial relationship sometimes may reduce the overlapping area between the power transmitter side active electrode 12 and the power receiver side active electrode 22, and reduce the power transmission efficiency.

SUMMARY OF THE INVENTION

Thus, an object of the present invention is to provide an electric field coupling type power transmission system capable of sufficiently suppressing a reduction of the power transmission efficiency even when the relative spatial relationship between the power transmitter device and the power receiver device varies within a plane perpendicular to a direction along which the power transmitter device and the power receiver device overlap (or line up).

The present invention relates to a wireless power transmission system including: a power transmitter device including an AC generator circuit, a power transmitter side active electrode, and a power transmitter side passive electrode, the power transmitter side active electrode and the power transmitter side passive electrode connecting to the AC generator circuit; and a power receiver device including a load circuit, a power receiver side active electrode, and a power receiver side passive electrode, the power receiver side active electrode and the power receiver side passive electrode connecting to the load circuit; wherein electrical power is transmitted by arranging the power transmitter side active electrode and the power receiver side active electrode to overlap each other and by arranging the power transmitter side passive electrode and the power receiver side passive electrode to overlap each other. The wireless power transmission system has the following features. A plane is formed in parallel to an overlapping plane of the power transmitter side active electrode and the power receiver side active electrode, and a relative position of the power transmitter device and the power receiver device is allowed to be displaced in each of a first direction and a second direction within predetermined ranges, the first direction and the second direction being orthogonal to each other.

A second direction length of overlapping region between the power transmitter side active electrode and the power receiver side active electrode is constant even when one of the power transmitter side active electrode and the power receiver side active electrode is displaced relative to the other active electrode in the first direction and the relative position is changed in the range where the displacement is permitted.

A first direction length of overlapping region between the power transmitter side active electrode and the power receiver side active electrode is constant even when one of the power transmitter side active electrode and the power receiver side active electrode is displaced relative to the other active electrode in the second direction and the relative position is changed in the range where the displacement is permitted.

Here, b is the length of the one of the power transmitter side active electrode and the power receiver side active electrode in the first direction, a is the length thereof in the second direction. Furthermore, B is the length of the other active electrode in the first direction, and A is the length thereof in the second direction.

Under this condition, $b<B$ and $A<a$, or $B<b$ and $a<A$ are satisfied.

The power transmitter side active electrode and the power receiver side active electrode are formed so as to satisfy these conditions.

Adopting this configuration enables the overlapping area between the power transmitter side active electrode and the power receiver side active electrode to be constant anywhere in the ranges along the first direction and the second direction, in which the displacement is permitted, as described above. Accordingly, constant power transmission efficiency may be obtained without being affected by the change in relative spatial relationship between the power transmitter device and the power receiver device.

Furthermore, the following configuration may be applied to a wireless power transmission system of the present invention. Here, a permissible displacement length in the first direction is $\Delta L1$, and a permissible displacement length in the second direction is $\Delta L2$. In this condition, $b<B=b+\Delta L1$ and $A<a=A+\Delta L2$, or $B<b=B+\Delta L1$ and $a<A=a+\Delta L2$ are satisfied.

In the configuration where the overlapping area between the power transmitter side active electrode and the power receiver side active electrode is kept constant anywhere in the ranges along the first direction and the second direction in which the displacement is permitted, this configuration enables the power transmitter side active electrode and the power receiver side active electrode to be formed into smaller sizes. Accordingly, the power transmitter device and the power receiver device may be made smaller.

Furthermore, it is preferable that a wireless power transmission system of the present invention has the following configuration.

The power transmitter device may include the power transmitter side passive electrode in such a way that gaps are formed on both sides of the power transmitter side active electrode in the first direction and on both ends thereof in the second direction.

The power receiver device may include the power receiver side passive electrode in such a way that gaps are formed on both sides of the power receiver side active electrode in the first direction and on both ends thereof in the second direction.

The power transmitter side passive electrode and the power receiver side passive electrode may have shapes that overlap each other at least part thereof in the range where the displacement is permitted.

Here, d is a gap length in the first direction of one of the passive electrodes corresponding to the one of the power transmitter side active electrode and the power receiver side active electrode, c is a gap length thereof in the second direction, D is a gap length in the first direction of the other passive electrode corresponding to the other active electrode, and C is a gap length thereof in the second direction.

Under this condition, $b<B<(b+d)/2$ and $A<a<(A+C)/2$, or $B<b<(B+D)/2$ and $a<A<(a+c)/2$ are satisfied.

In this configuration, even when the relative spatial relationship between the power transmitter device and the power receiver device changes in the range where the displacement is permitted, the power transmitter side active electrode and the power receiver side passive electrode do not overlap, and the power receiver side active electrode and the power transmitter side passive electrode do not overlap. Accordingly, the power transmission efficiency may be more reliably maintained at high efficiency.

Furthermore, the following configuration may be employed in a wireless power transmission system of the present invention.

The power transmitter device may include the power transmitter side passive electrode in such a way that gaps are formed on both sides of the power transmitter side active electrode in the first direction and on both ends thereof in the second direction.

The power receiver device may include the power receiver side passive electrode in such a way that gaps are formed on both sides of the power receiver side active electrode in the first direction and on both ends thereof in the second direction.

The power transmitter side passive electrode and the power receiver side passive electrode may have shapes that overlap each other at least part thereof in the range where the displacement is permitted.

In this configuration, specific examples are illustrated to form the passive electrode, the shape of which is not limited to the shape surrounding the active electrode.

Still furthermore, the present invention may be configured as follows.

The gap between the power transmitter side active electrode and the power receiver side active electrode may be made different from the gap between the power transmitter side passive electrode and the power receiver side passive electrode.

This configuration improves flexibility in designing the shapes of the power transmitter side active electrode and the power receiver side active electrode, or the shapes of the power transmitter side passive electrode and the power receiver side passive electrode. Furthermore, this configuration also improves flexibility in setting degree of coupling between the power transmitter side active electrode and the power receiver side active electrode or between the power transmitter side passive electrode and the power receiver side passive electrode.

Furthermore, in a wireless power transmission system of the present invention, it is preferable that the gap between the power transmitter side active electrode and the power receiver side active electrode be longer than the gap between the power transmitter side passive electrode and the power receiver side passive electrode.

This configuration allows the gap between the power transmitter side active electrode and the power receiver side active electrode to be wider, making it possible to improve insulation property between these active electrodes.

Furthermore, in a wireless power transmission system of the present invention, it is preferable that the power transmitter side active electrode and the power receiver side active electrode be each a rectangular shape having sides in the first direction and the second direction.

The adoption of this configuration allows the aforementioned configurations to be achieved, and allows the power transmitter side active electrode and the power receiver side active electrode to be formed from a simple shape and obtain the aforementioned functions.

The power transmission efficiency equal to or larger than a predetermined value may be stably achieved even when the relative spatial relationship between the power transmitter device and the power receiver device varies within a plane perpendicular to the direction along which the power transmitter device and the power receiver device overlap (or line up).

BRIEF DESCRIPTION OF THE DRAWINGS

FIG. 5 illustrates a view illustrating a relationship in a first direction among a permissible displacement length $\Delta L1$, length b of a power transmitter side active electrode, and length B of a power receiver side active electrode, and a view illustrating a relationship in a second direction among a permissible displacement length $\Delta L2$, length a of the power transmitter side active electrode, and length A of the power receiver side active electrode.

FIG. 13 is a diagram illustrating shapes of a power transmitter side active electrode, a power transmitter side passive electrode, a power receiver side active electrode, and a power receiver side passive electrode of a wireless power transmission system according to a sixth embodiment of the present invention.

DETAILED DESCRIPTION OF THE PREFERRED EMBODIMENTS OF THE INVENTION

Figure 1:
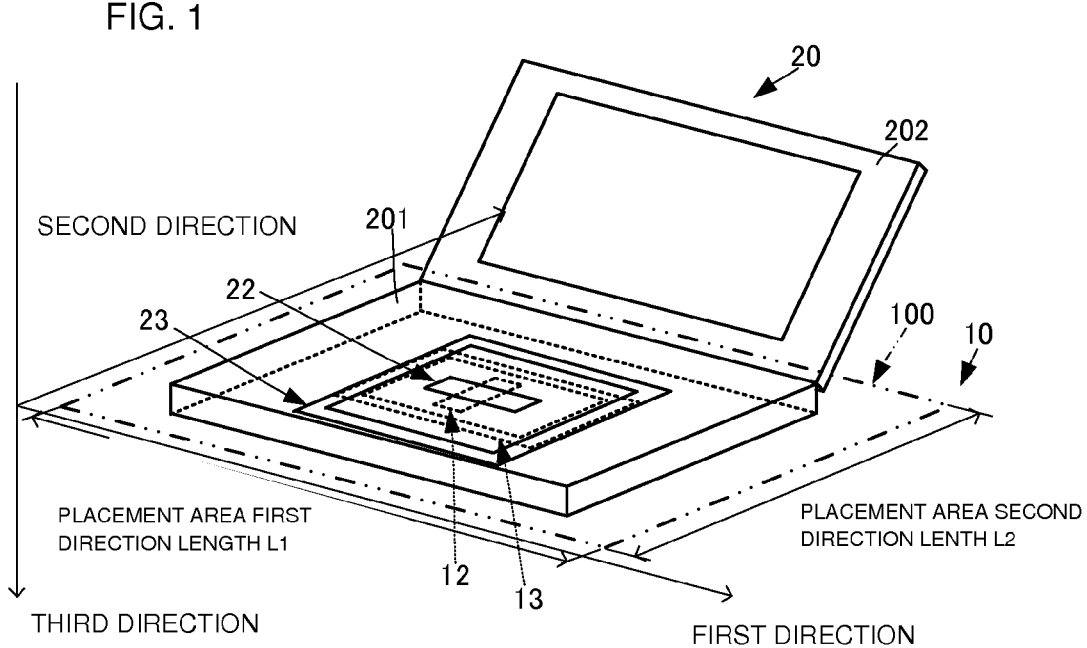
FIG. 1 is an external perspective view illustrating an example of a wireless power transmission system according to a first embodiment of the present invention.
Figure 2:
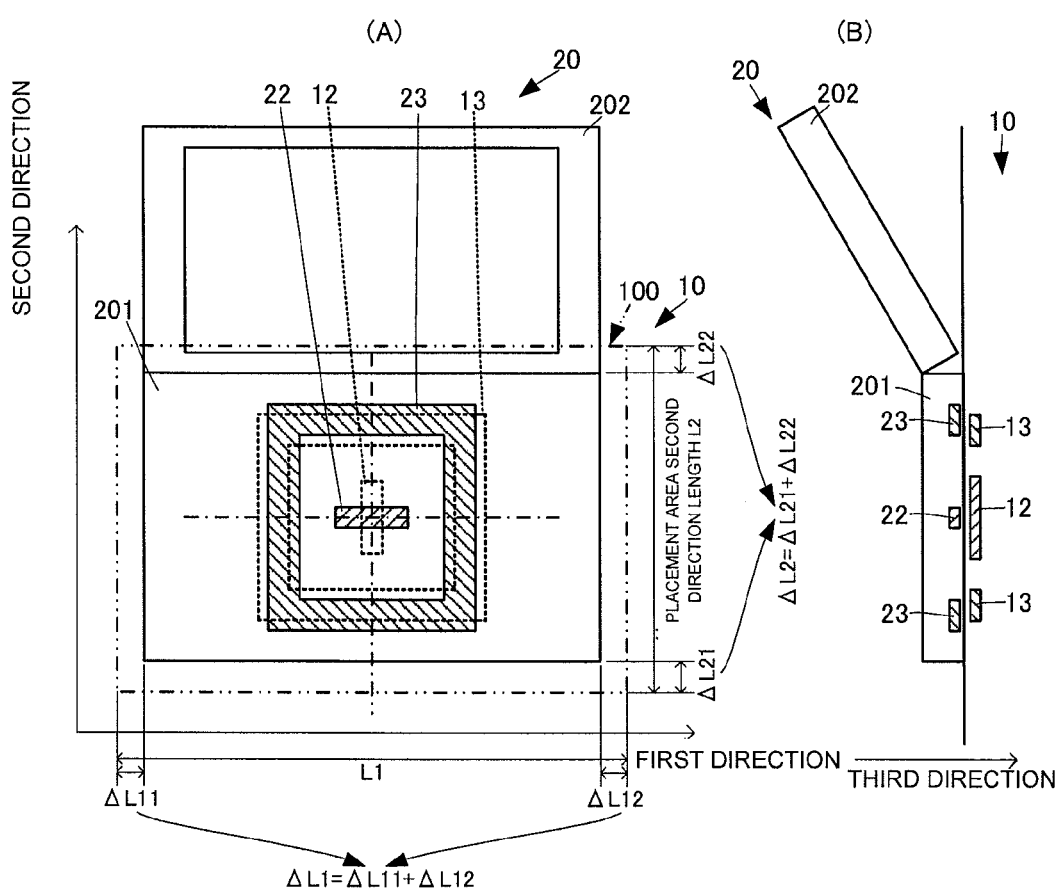
FIG. 2 illustrates a plan view and a side view of the example of a wireless power transmission system according to the first embodiment of the present invention.

A wireless power transmission system according to a first embodiment of the present invention is described with reference to the drawings. FIG. 1 is an external perspective view illustrating an example of the wireless power transmission system according to the first embodiment of the present invention. FIG. 2(A) is a plan view illustrating an example of the wireless power transmission system according to the first embodiment of the present invention, and FIG. 2(B) is its side view. For ease of understanding a configuration of the present embodiment, FIG. 1 and FIG. 2 explicitly illustrate each active electrode and each passive electrode arranged inside a power transmitter device and a power receiver device to allow them to be seen from the outside.

The wireless power transmission system according to the present embodiment includes a power transmitter device 10 and a power receiver device 20. The power transmitter device 10 may be, for example, a placement table with a top surface on which the power receiver device 20 is to be placed as illustrated in FIG. 1 and FIG. 2. The power receiver device 20 may be, for example, an electronic device such as a laptop personal computer or the like as illustrated in FIG. 1 and FIG. 2.

Figure 15:
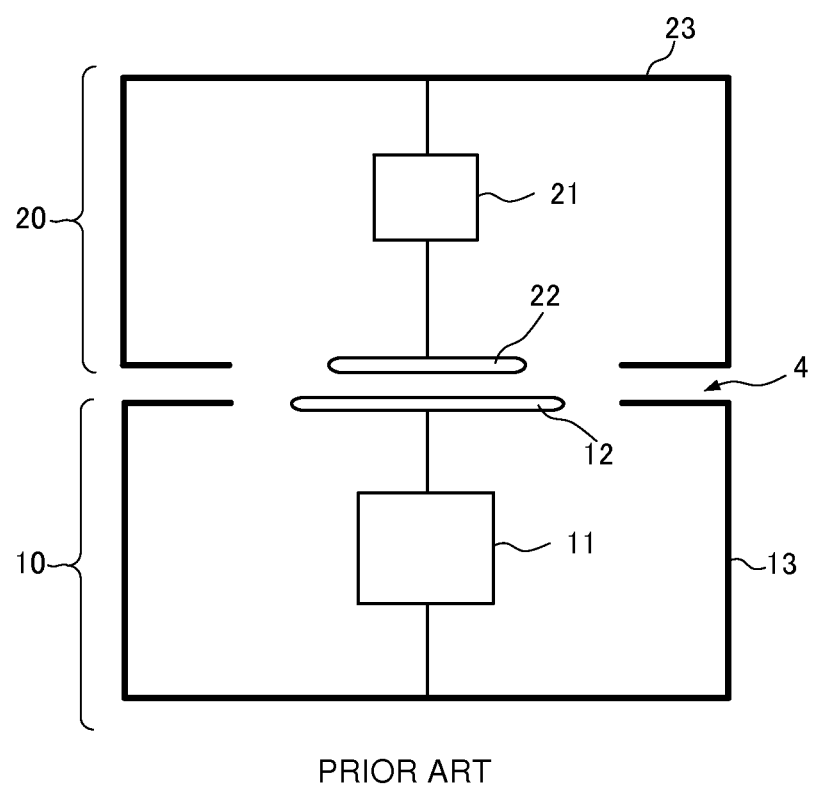
FIG. 15 is a diagram illustrating a basic configuration of a typical electric field coupling type power transmission system identical to a power transmission system described in Patent Document 1.

As illustrated in FIG. 15 described above, the power transmitter device 10 includes a high-frequency high-voltage generator circuit 11, a power transmitter side active electrode 12, and a power transmitter side passive electrode 13. The high-frequency high-voltage generator circuit 11, the power transmitter side active electrode 12, and the power transmitter side passive electrode 13 are arranged inside the power transmitter device 10. The high-frequency high-voltage generator circuit 11 generates an AC voltage at a high frequency (100 kHz to several tens of MHz) and a high voltage (several hundred V to several kV).

The power transmitter side active electrode 12 and the power transmitter side passive electrode 13 are connected to the high-frequency high-voltage generator circuit 11. This high-frequency and high-voltage AC voltage is applied across the power transmitter side active electrode 12 and the power transmitter side passive electrode 13. In this case, by setting a reference voltage at the power transmitter side passive electrode 13, a power transmitter side active electrode 12 side becomes a high voltage side.

The power transmitter side active electrode 12 and the power transmitter side passive electrode 13 are plate-like electrodes. Specific shapes thereof will be described below. The power transmitter side active electrode 12 and the power transmitter side passive electrode 13 are arranged so as that each plate surface thereof is parallel to the surface of the power transmitter device 10. The power transmitter side active electrode 12 and the power transmitter side passive electrode 13 are arranged inside the power transmitter device 10 and near the surface of the power transmitter device 10.

On the surface of the power transmitter device 10, a placement receivable area 100 is defined. This is an area in which the power receiver device 20 is allowed to be placed. The placement receivable area 100 is defined by lengths in a first direction and a second direction on the surface of the power transmitter device 10. The first direction and the second direction are orthogonal to each other. For example, as illustrated in FIG. 1 and FIG. 2, the length of the placement receivable area 100 in the first direction is defined as a placement area first direction length L1. The length of the placement receivable area 100 in the second direction is defined as a placement area second direction length L2. In other words, the placement receivable area 100 is a rectangular shape when viewed from a third direction (direction orthogonal to the first direction and the second direction) that is a direction orthogonal to the surface of the power transmitter device 10.

Hereinafter, the configuration of the present embodiment is described in detail. According to the following configuration, the power receiver device 20 may receive electric power at the same power transmission efficiency as long as the power receiver device 20 is placed within the placement receivable area 100.

The power receiver device 20 includes a first housing 201 and a second housing 202. In the present embodiment, the power receiver device 20 includes the second housing 202 since a laptop personal computer is used as an example. However, the power receiver device 20 only needs the first housing 201 at minimum, with which the power receiver device 20 may be placed on the surface of the power transmitter device 10. A back surface of the first housing 201 is a flat surface.

As illustrated in FIG. 15 described above, the power receiver device 20 includes a high-frequency high-voltage load circuit 21, a power receiver side active electrode 22, and a power receiver side passive electrode 23. These components are placed inside the first housing 201.

The power receiver side active electrode 22 and the power receiver side passive electrode 23 are plate-like electrodes. Specific shapes thereof will be described below. The power receiver side active electrode 22 and the power receiver side passive electrode 23 are arranged so as that each plate surface thereof is parallel to the back surface of the power receiver device 20. The power receiver side active electrode 22 and the power receiver side passive electrode 23 are arranged inside the power receiver device 20 and near the back surface of the power receiver device 20.

In this case, although specific shapes will be described below, the electrodes are formed so as that the power receiver side active electrode 22 and the power transmitter side active electrode 12 overlap each other with having a predetermined overlapping area, and that the power receiver side passive electrode 23 and the power transmitter side passive electrode 13 overlap each other with having a predetermined overlapping area, when the power receiver device 20 is placed on the surface of the power transmitter device 10. The power receiver side active electrode 22 and the power receiver side passive electrode 23 are connected to the high-frequency high-voltage load circuit 21.

The high-frequency high-voltage load circuit 21 lowers and rectifies the high-frequency high-voltage transmitted from the power transmitter device 10 and generates a predetermined DC voltage for use in receiving electric power or as a power source of a functional device of the receiver device 20.

In the power transmitter device 10 and the power receiver device 20 having the configurations as described above, the power transmitter side active electrode 12, the power transmitter side passive electrode 13, the power receiver side active electrode 22, and the power receiver side passive electrode 23 are formed into the following shapes.

Figure 3:
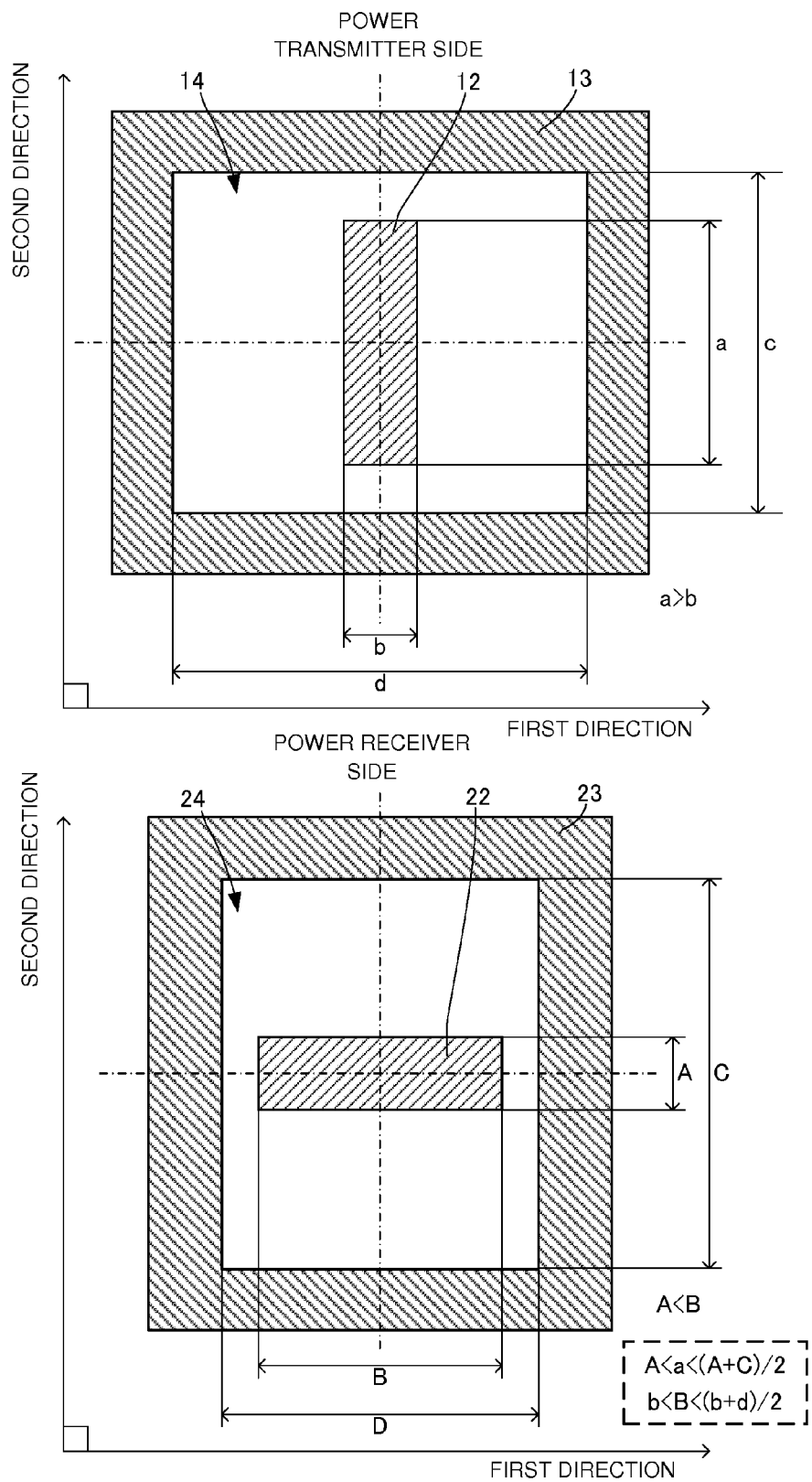
FIG. 3 is a plan view of a power transmitter side active electrode 12, a power transmitter side passive electrode 13, a power receiver side active electrode 22, and a power receiver side passive electrode 23.
Figure 4:
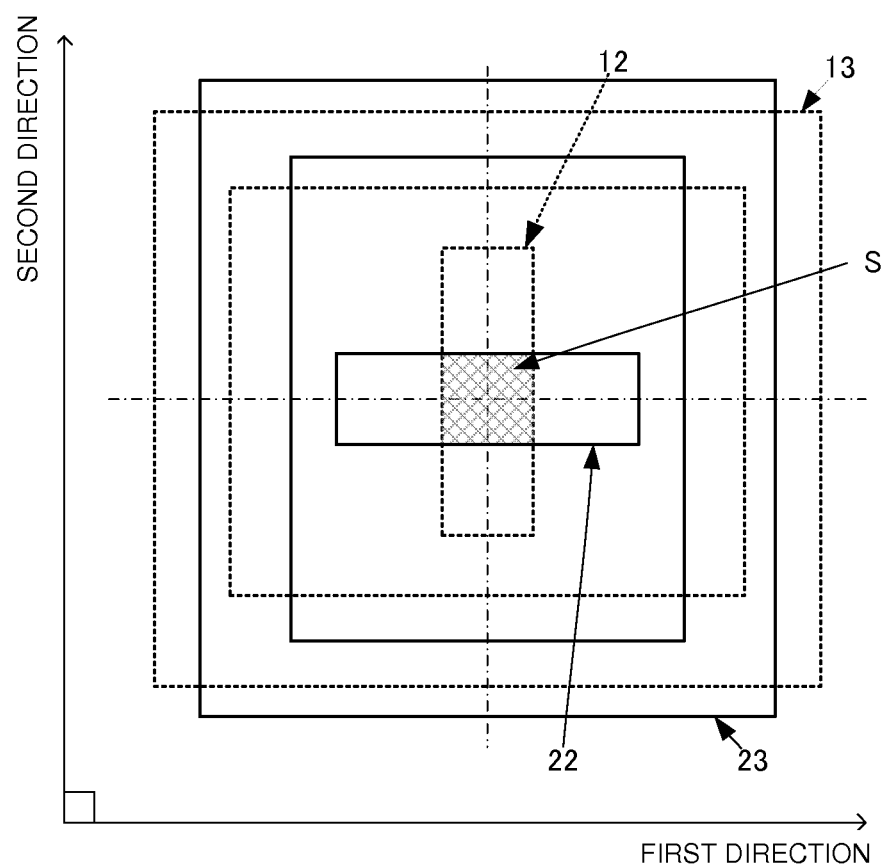
FIG. 4 is a plan view when the power transmitter side active electrode 12 and the power receiver side active electrode 22 overlap each other near at their centers.

FIG. 3 is a top view of the power transmitter side active electrode 12, the power transmitter side passive electrode 13, the power receiver side active electrode 22, and the power receiver side passive electrode 23. FIG. 4 is a plan view when the power transmitter side active electrode 12 and the power receiver side active electrode 22 overlap each other near at their centers.

The power transmitter side active electrode 12 has a rectangular shape when viewed in the third direction that is orthogonal to both the first and second directions. The length of the power transmitter side active electrode 12 is b in the first direction and a in the second direction. Here, a>b is satisfied. In other words, the power transmitter side active electrode 12 is formed into a rectangular shape in which the length b in the first direction is shorter than the length a in the second direction.

The power transmitter side passive electrode 13 is formed into a rectangular shape with an opening part 14 so as to surround the power transmitter side active electrode 12 when viewed in the third direction orthogonal to both the first and second directions. An opening width of the power transmitter side passive electrode 13 in the first direction is d. An opening width of the power transmitter side passive electrode 13 in the second direction is c.

The power transmitter side active electrode 12 is arranged relative to the power transmitter side passive electrode 13 with the opening part 14 described above so as that centers of the power transmitter side active electrode 12 in the first and second directions substantially coincide with the center of the opening part 14.

The power receiver side active electrode 22 has a rectangular shape when viewed in the third direction orthogonal to both the first and second directions. The length of the power receiver side active electrode 22 is B in the first direction and A in the second direction. Here, A<B is satisfied. In other words, the power receiver side active electrode 22 is formed into a rectangular shape in which the length B in the first direction is longer than the length A in the second direction.

The power receiver side passive electrode 23 is formed into a rectangular shape with an opening part 24 so as to surround the power receiver side active electrode 22 when viewed in the third direction orthogonal to both the first and second directions. An opening width of the power receiver side passive electrode 23 in the first direction is D. An opening width of the power receiver side passive electrode 23 in the second direction is C.

The power receiver side active electrode 22 is arranged relative to the power receiver side passive electrode 23 with the opening part 24 described above so as that centers of the power receiver side active electrode 22 in the first and second directions substantially coincide with the center of the opening part 24.

Here, the length b of the power transmitter side active electrode 12 in the first direction and the length B of the power receiver side active electrode 22 in the first direction satisfy the relationship b<B. In other words, the length b of the power transmitter side active electrode 12 in the first direction is shorter than the length B of the power receiver side active electrode 22 in the first direction.

Furthermore, the length a of the power transmitter side active electrode 12 in the second direction and the length A of the power receiver side active electrode 22 in the second direction satisfy the relationship A<a. In other words, the length a of the power transmitter side active electrode 12 in the second direction is longer than the length A of the power receiver side active electrode 22 in the second direction.

The configuration described above allows the overlapping area between the power transmitter side active electrode 12 and the power receiver side active electrode 22 to be unchanged even when the power receiver device 20 is displaced on the surface of the power transmitter device 10 for predetermined amounts in the first direction and the second directions, thereby making it possible to suppress the decrease in power transmission efficiency.

As illustrated in FIG. 5, the longer one of the power transmitter side active electrode 12 and the power receiver side active electrode 22 can be specified with a permissible displacement length $\Delta L1$ in the first direction and a permissible displacement length $\Delta L2$ in the second direction of the placement receivable area 100. It may be defined by subtracting the length of the power receiver device 20 in the first direction from the placement area first direction length L1 of the placement receivable area 100. The permissible displacement length $\Delta L2$ may be defined by subtracting the length of the power receiver device 20 in the second direction from the placement area second direction length L2 of the placement receivable area 100.

FIG. 5(A) is a view illustrating a relationship in the first direction among the permissible displacement length $\Delta L1$, the length b of the power transmitter side active electrode 12, and the length B of the power receiver side active electrode 22. FIG. 5(B) is a view illustrating a relationship in the second direction among the permissible displacement length $\Delta L2$, the length a of the power transmitter side active electrode 12, and the length A of the power receiver side active electrode 22.

As illustrated in FIG. 5(A), when the power receiver device 20 is placed at a boundary position of the placement receivable area 100 in the first direction, the length B of the power receiver side active electrode 22 is equal to a sum of the length b of the power transmitter side active electrode 12 and the permissible displacement length $\Delta L1$. That is, $B=b+\Delta L1$ is satisfied.

As illustrated in FIG. 5(B), when the power receiver device 20 is placed at a boundary position of the placement receivable area 100 in the second direction, the length a of the power transmitter side active electrode 22 is equal to a sum of the length A of the power receiver side active electrode 12 and the permissible displacement length $\Delta L2$. That is, $a=A+\Delta L2$ is satisfied.

Accordingly, wherever the power receiver device 20 is placed, as long as the power receiver device 20 is inside the placement receivable area 100, it is possible to prevent the power transmission efficiency from decreasing and further prevent the power transmitter side active electrode 12 and the power receiver side active electrode 22 from being longer than necessary by satisfying $B=b+\Delta L1$ and $a=A+\Delta L2$. This allows the receiver device 20 to be made smaller as much as possible while ensuring the power transmission efficiency.

Furthermore, in the configuration of the present embodiment, an additional factor of decreasing in the power transmission efficiency may be eliminated by including the following configuration.

Figure 6:
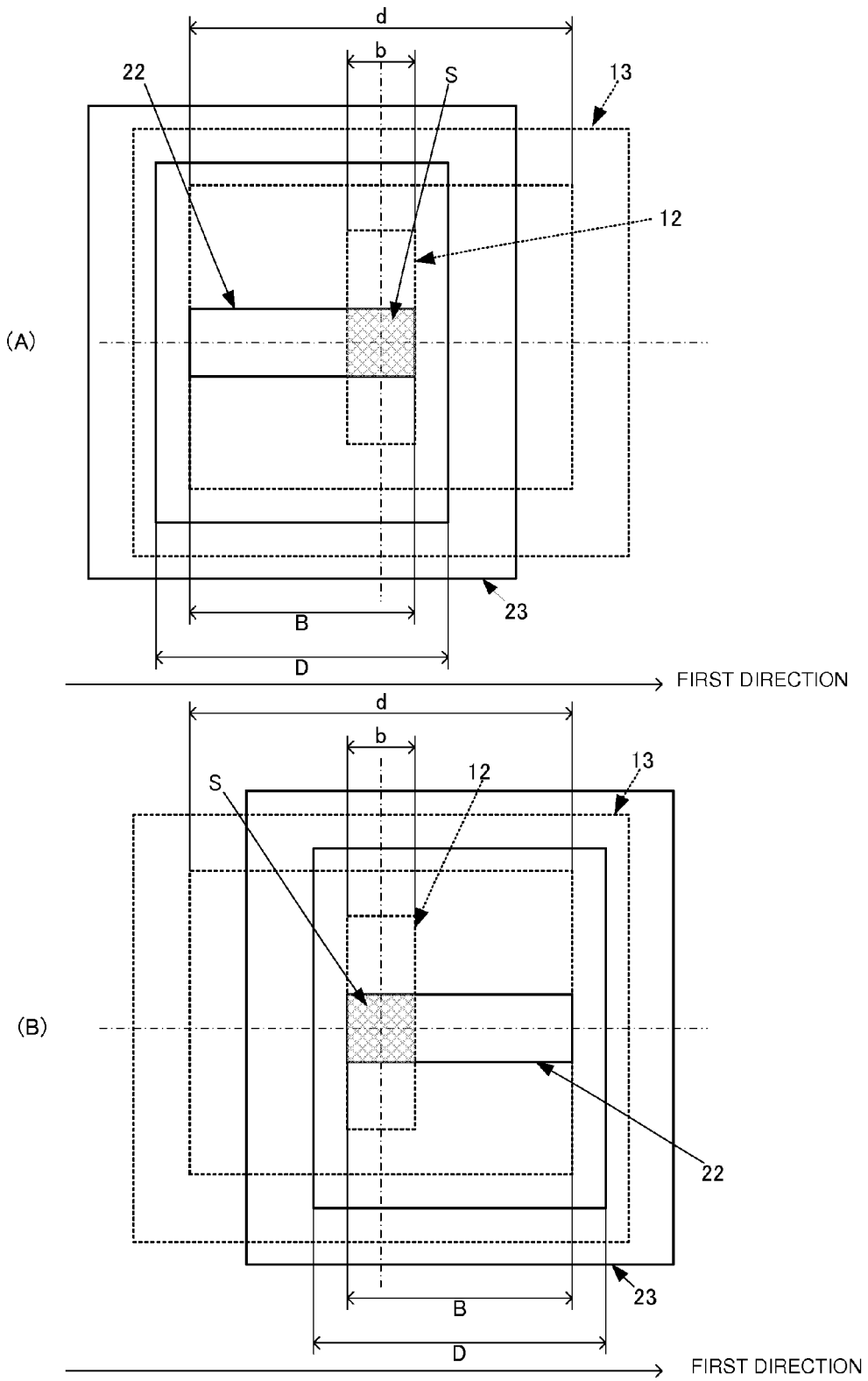
FIG. 6 illustrates views each illustrating a spatial relationship among the power transmitter side active electrode, the power transmitter side passive electrode, the power receiver side active electrode, and the power receiver side passive electrode when a power receiver device is displaced in the first direction.

FIG. 6 illustrates views each illustrating a spatial relationship among the power transmitter side active electrode 12, the power transmitter side passive electrode 13, the power receiver side active electrode 22, and the power receiver side passive electrode 23 when the power receiver device 20 is displaced in the first direction. FIG. 6(A) illustrates a case when the power receiver device 20 is displaced to one direction in the first direction, and FIG.

6(B) illustrates a case when the power receiver device 20 is displaced to the other direction in the first direction.

As illustrated in FIG. 6, when the power receiver device 20 is displaced in the first direction on the power transmitter device 10, a first direction edge portion of the power receiver side active electrode 22 that is longer in the first direction moves close to the power transmitter side passive electrode 13. It is known that the power transmission efficiency decreases when the power receiver side active electrode 22 and the power transmitter side passive electrode 13 overlap each other and a capacitor is formed in between them.

Accordingly, the decrease in power transmission efficiency may be prevented by setting dimensions so as that the power receiver side active electrode 22 and the power transmitter side passive electrode 13 do not overlap each other even when the power receiver device 20 is displaced on the power transmitter device 10 in the first direction within the placement receivable area 100.

In the case where an opening width of the opening part 14 in the first direction is wide enough so as that the power receiver side active electrode 22 and the power transmitter side passive electrode 13 do not overlap each other even when the power receiver device 20 is displaced up to a boundary of the placement receivable area 100 in the first direction, the length B of the power receiver side active electrode 22 may be specified with the foregoing permissible displacement length $\Delta L1$.

On the other hand, the following alternative method may be adopted to design the dimensions when the opening width d of the opening part 14 in the first direction cannot be a large enough value.

According to the relationships illustrated in FIG. 6(A) and FIG. 6(B), it suffices that the length b of the power transmitter side active electrode 12, the length B of the power receiver side active electrode 22, and the opening width d of the power transmitter side passive electrode 13 satisfy the relationship $2B-b<d$ in order to avoid the overlapping of the power receiver side active electrode 22 and the power transmitter side passive electrode 13 when the power receiver device 20 is displaced up to the boundary of the placement receivable area 100 in the first direction. Thus, the length B of the power receiver side active electrode 22 may be determined so as to satisfy $B<(b+d)/2$.

Figure 7:
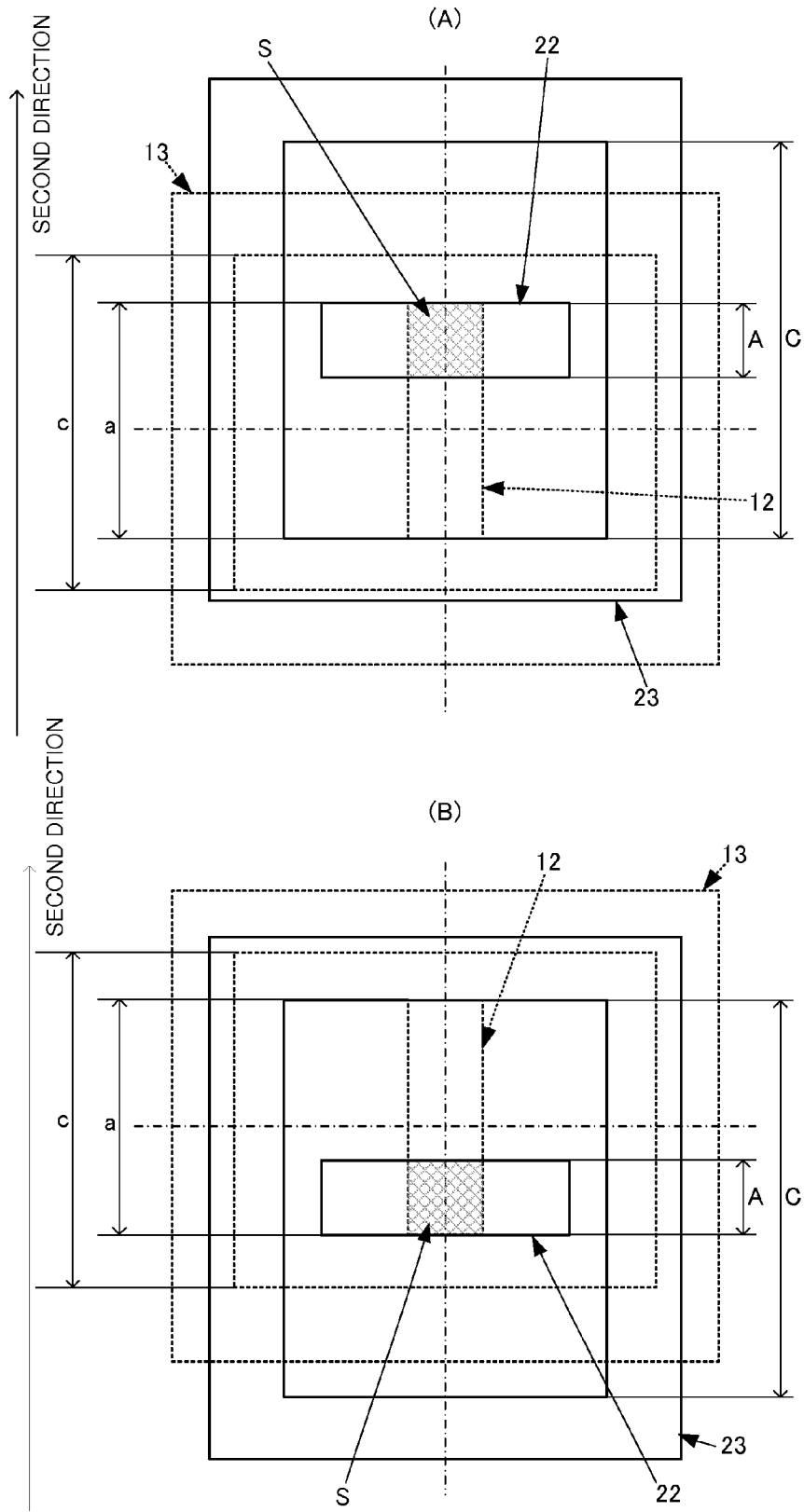
FIG. 7 illustrates views each illustrating a spatial relationship among the power transmitter side active electrode, the power transmitter side passive electrode, the power receiver side active electrode, and the power receiver side passive electrode when a power receiver device is displaced in the second direction.

FIG. 7 illustrates views each illustrating a spatial relationship among the power transmitter side active electrode 12, the power transmitter side passive electrode 13, the power receiver side active electrode 22, and the power receiver side passive electrode 23 when the power receiver device 20 is displaced in the second direction. FIG. 7(A) illustrates a case when the power receiver device 20 is displaced to one direction in the second direction, and FIG. 7(B) illustrates a case when displaced to the other direction in the second direction.

As illustrated in FIG. 7, when the power receiver device 20 is displaced in the second direction on the power transmitter device 10, a first direction edge portion of the power transmitter side active electrode 12 that is longer in the second direction moves close to the power receiver side passive electrode 23. It is known that the power transmission efficiency decreases when the power transmitter side active electrode 12 and the power receiver side passive electrode 23 overlap each other and a capacitor is formed in between them.

Accordingly, the decrease in power transmission efficiency may be prevented by setting dimensions so as that the power transmitter side active electrode 12 and the power receiver side passive electrode 23 do not overlap each other even when the power receiver device 20 is displaced on the power transmitter device 10 in the second direction within the placement receivable area 100.

In the case where an opening width of the opening part 24 in the second direction is wide enough so as that the power transmitter side active electrode 12 and the power receiver side passive electrode 23 do not overlap each other even when the power receiver device 20 is displaced up to a boundary of the placement receivable area 100 in the second direction, the length a of the power transmitter side active electrode 12 may be specified with the foregoing permissible displacement length $\Delta L2$.

On the other hand, the following alternative method may be adopted to design the dimensions when the opening width C of the opening part 24 in the second direction cannot be a large enough value.

According to the relationships illustrated in FIG. 7(A) and FIG. 7(B), it suffices that the length A of the power receiver side active electrode 22, the length a of the power transmitter side active electrode 12, and the opening width C of the power receiver side passive electrode 23 satisfy the relationship $2a-A<C$ in order to avoid the overlapping of the power transmitter side active electrode 12 and the power receiver side passive electrode 23 when the power receiver device 20 is displaced up to the boundary of the placement receivable area 100 in the second direction. Thus, the length A of the power receiver side active electrode 22 may be determined so as to satisfy $a<(A+C)/2$.

By adopting the configuration described above, even when the power receiver device 20 is displaced on the surface of the power transmitter device 10 at least in one of the first direction and the second direction, and positioned anywhere in the placement receivable area 100, the overlapping area between the power transmitter side active electrode 12 and the power receiver side active electrode 22 does not change. Furthermore, the power transmitter side active electrode 12 and the power receiver side passive electrode 23 do not overlap each other, and the power receiver side active electrode 22 and power transmitter side passive electrode 13 do not overlap each other. Accordingly, the decrease in power transmission efficiency may be prevented.

Figure 8:
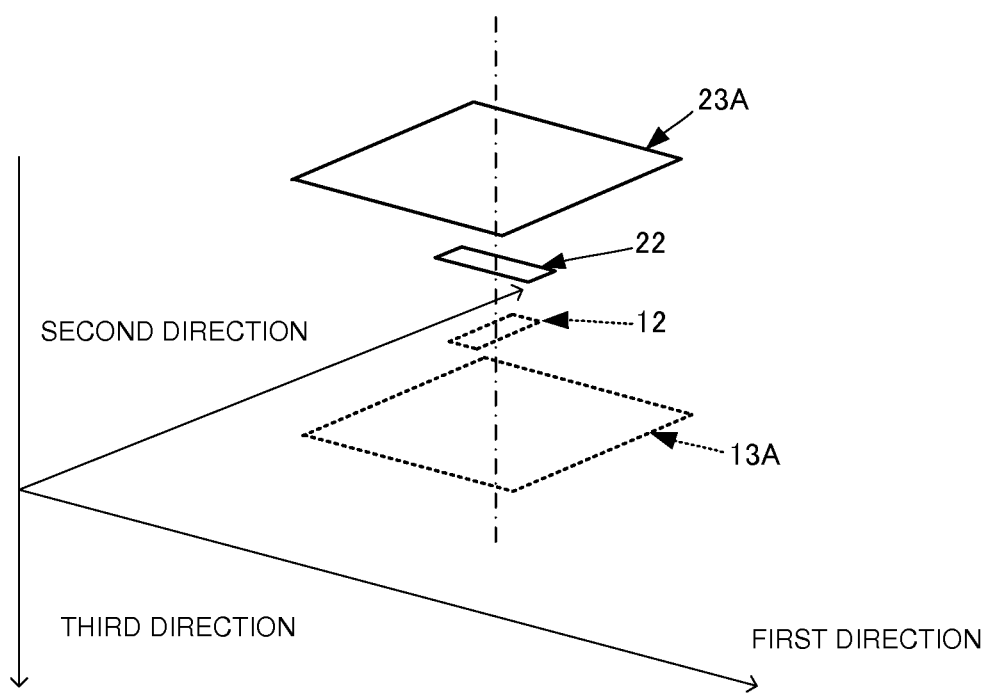
FIG. 8 is a perspective view illustrating a spatial relationship among a power transmitter side active electrode, a power transmitter side passive electrode, a power receiver side active electrode, and a power receiver side passive electrode of a wireless power transmission system according to a second embodiment of the present invention.

Next, a wireless power transmission system according to a second embodiment is described with reference to the drawings. FIG. 8 is a perspective view illustrating a spatial relationship among a power transmitter side active electrode, a power transmitter side passive electrode, a power receiver side active electrode, and a power receiver side passive electrode of the wireless power transmission system according to the second embodiment of the present invention.

The wireless power transmission system of the present embodiment is different from the wireless power transmission system illustrated in the first embodiment in shape and in arrangement position of a power transmitter side passive electrode 13A and a power receiver side passive electrode 23A. The remaining configuration is the same as that of the wireless power transmission system illustrated in the first embodiment.

The power transmitter side passive electrode 13A is arranged on the other side of the power receiver side active electrode 22 with the power transmitter side active electrode 12 in between them. The power transmitter side passive electrode 13A is positioned a predetermined distance away from the power transmitter side active electrode 12 in the third direction. The power transmitter side passive electrode 13A is a rectangle shape when viewed in the third direction.

The power transmitter side passive electrode 13A and the power transmitter side active electrode 12 overlap each other when viewed in the third direction.

The power receiver side passive electrode 23A is arranged on the other side of the power transmitter side active electrode 12 with the power receiver side active electrode 22 in between them. The power receiver side passive electrode 23A is positioned a predetermined distance away from the power receiver side active electrode 22 in the third direction. The power receiver side passive electrode 23A is a rectangle shape when viewed in the third direction. The power receiver side passive electrode 23A and the power receiver side active electrode 22 overlap each other when viewed in the third direction.

The power receiver side passive electrode 23A and the power transmitter side passive electrode 13A are configured so as to overlap each other with having a predetermined area.

In the configuration described above, the power transmitter side active electrode 12 is not surrounded by the power transmitter side passive electrode 13A. Furthermore, the power receiver side active electrode 22 is not surrounded by the power receiver side passive electrode 23A.

Accordingly, the power transmitter side active electrode 12 and the power receiver side active electrode 22 may be formed so as to satisfy A<a and b<B as described above.

Figure 9:
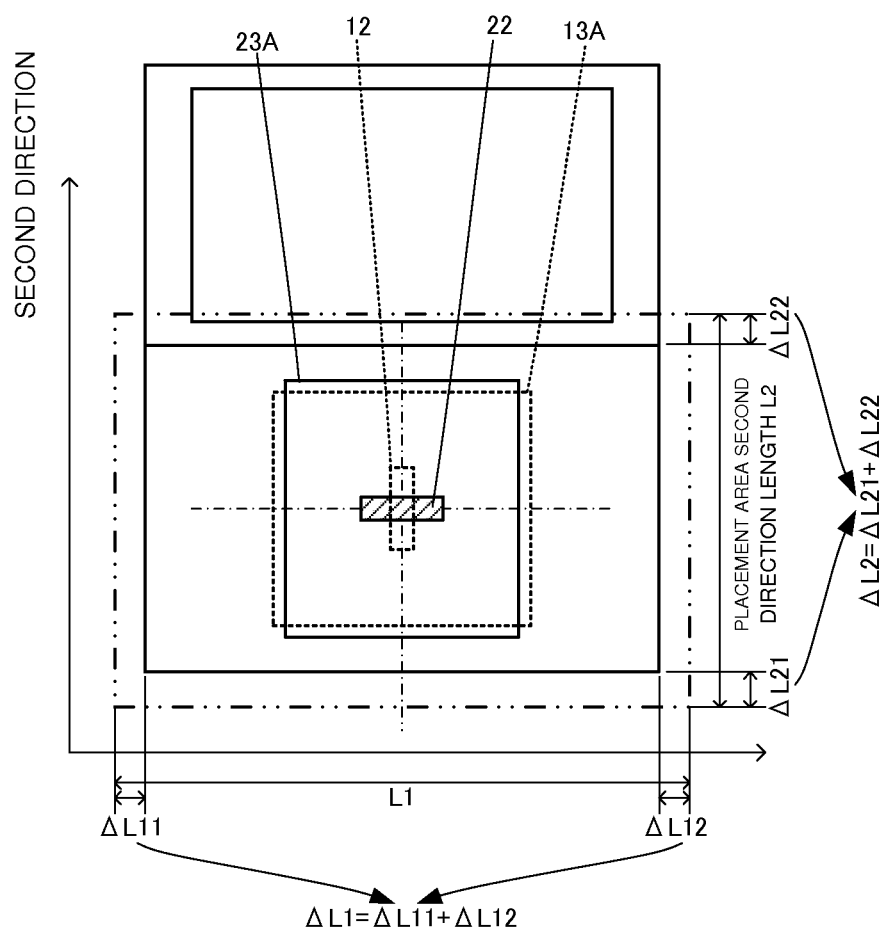
FIG. 9 is a plan view illustrating concepts of the permissible displacement lengths $\Delta L1$ and $\Delta L2$ in the wireless power transmission system of the present embodiment.

Furthermore, FIG. 9 is a plan view illustrating a concept of the permissible displacement lengths ΔL1 and ΔL2 in the wireless power transmission system of the present embodiment. As illustrated in FIG. 9, specific requirements for the length of the power transmitter side active electrode 12 and the length of the power receiver side active electrode 22 given by the permissible displacement lengths ΔL1 and ΔL2 are the same as those of the first embodiment (see, FIG. 2 and FIG. 5). Accordingly, as is the case with the foregoing first embodiment, upper limits of the power transmitter side active electrode 12 and the power receiver side active electrode 22 may be specified with the permissible displacement lengths ΔL1 and ΔL2.

Even with the configuration described above, as is the case with the first embodiment, the decrease in power transmission efficiency may be prevented even when the power receiver device 20 is displaced on the surface of the power transmitter device 10 at least in one of the first direction and the second direction, and positioned anywhere in the placement receivable area 100.

Furthermore, in the configuration such that the power transmitter side passive electrode is arranged on the other side of the power receiver side active electrode with the power transmitter side active electrode in between and that the power receiver side passive electrode is arranged on the other side of the power transmitter side active electrode with the power receiver side active electrode in between, as described above, a non-overlapping area between the power transmitter side active electrode and the power receiver side active electrode becomes smaller by adopting the configuration with b<B and A<a, or with B<b and a<A, compared to the configuration with, for example, A<a and B<b. Thus, stray capacitance between the power transmitter side active electrode and the power receiver side passive electrode and stray capacitance between the power receiver side active electrode and the power transmitter side passive electrode are reduced.

Figure 10:
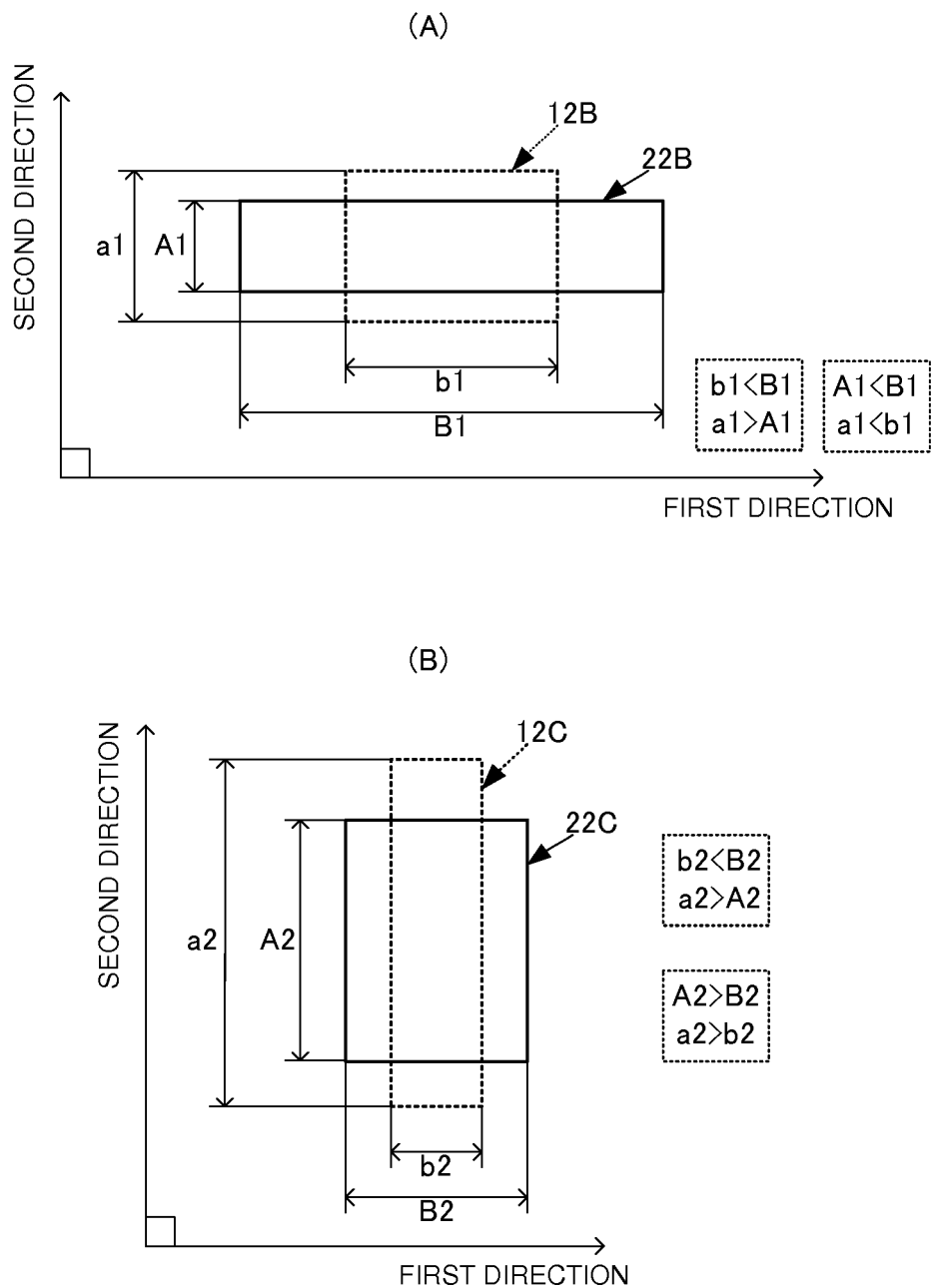
FIG. 10 is a diagram illustrating shapes of a power transmitter side active electrode and a power receiver side active electrode of a wireless power transmission system according to a third embodiment of the present invention.

Next, a wireless power transmission system according to a third embodiment is described with reference to the drawings. FIG. 10 is a diagram illustrating shapes of a power transmitter side active electrode and a power receiver side active electrode of the wireless power transmission system according to the third embodiment of the present invention. FIG. 10(A) illustrates a case where both the power transmitter side active electrode and the power receiver side active electrode are longer in the first direction, and FIG. 10(B) illustrates a case where both the power transmitter side active electrode and the power receiver side active electrode are longer in the second direction. Other constituting elements that form the wireless power transmission system are the same as those of the foregoing first and second embodiments, and illustrations and descriptions thereof are omitted.

As illustrated in FIG. 10(A), the length b1 of a power transmitter side active electrode 12B in the first direction is longer than the length a1 in the second direction (b1>a1). The length B1 of a power receiver side active electrode 22B in the first direction is longer than the length A1 in the second direction (B1>A1).

The length b1 of the power transmitter side active electrode 12B in the first direction is shorter than the length B1 of the power receiver side active electrode 22B in the first direction (b1<B1). The length a1 of the power transmitter side active electrode 12B in the second direction is longer than the length A1 of the power receiver side active electrode 22B in the second direction (a1>A1).

Even with the configuration described above, a long-and-short relation between the power transmitter side active electrode 12B and the power receiver side active electrode 22B is reversed in the first direction and the second direction. Thus, the functions and effects similar to those of each foregoing embodiment may be obtained.

As illustrated in FIG. 10(B), the length b2 of a power transmitter side active electrode 12C in the first direction is shorter than the length a2 in the second direction (b2<a2). The length B2 of a power receiver side active electrode 22C in the first direction is shorter than the length A2 in the second direction (B2<A2).

The length b2 of the power transmitter side active electrode 12C in the first direction is shorter than the length B2 of the power receiver side active electrode 22C in the first direction (b2<B2). The length a2 of the power transmitter side active electrode 12C in the second direction is longer than the length A2 of the power receiver side active electrode 22C in the second direction (a2>A2).

Even with the configuration described above, a long-and-short relation between the power transmitter side active electrode 12C and the power receiver side active electrode 22C is reversed in the first direction and the second direction. Thus, functions and effects similar to those of each foregoing embodiment may be obtained.

Figure 11:
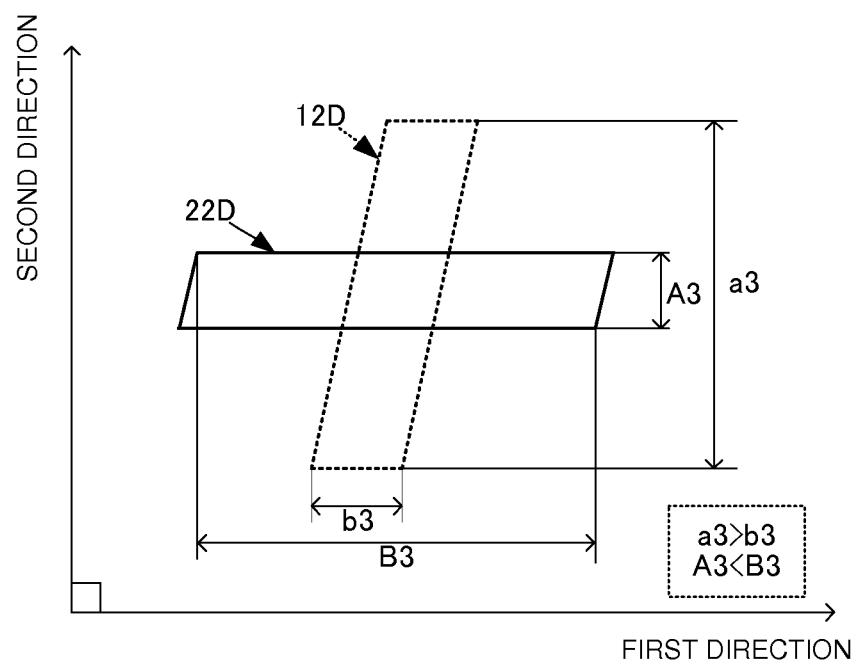
FIG. 11 is a diagram illustrating shapes of a power transmitter side active electrode and a power receiver side active electrode of a wireless power transmission system according to a fourth embodiment of the present invention.

Next, a wireless power transmission system according to a fourth embodiment is described with reference to the drawings. FIG. 11 is a diagram illustrating shapes of a power transmitter side active electrode and a power receiver side active electrode of the wireless power transmission system according to the fourth embodiment of the present invention.

The wireless power transmission system of the present embodiment is different from the wireless power transmission systems illustrated in the first and second embodiments in shape of a power transmitter side active electrode 12D and a power receiver side active electrode 22D. The remaining constituting elements are the same as those of the foregoing first and second embodiments, and illustrations and descriptions thereof are omitted.

The power transmitter side active electrode 12D and the power receiver side active electrode 22D are each a parallelogram shape when viewed in the third direction.

The power transmitter side active electrode 12D has a shape that is shorter in the first direction than the second direction. The power transmitter side active electrode 12D has two sides that are parallel to the first direction and positioned a predetermined distance away from each other in the second direction. Positions of these sides in the first direction do not coincide with each other. The power transmitter side active electrode 12D has two parallel sides that cross the first direction and the second direction at predetermined angles so as to connect those two sides parallel to the first direction. Accordingly, the power transmitter side active electrode 12D is formed into a parallelogram shape including a side parallel to the first side.

The power receiver side active electrode 22D has a shape that is shorter in the second direction than the first direction. The power receiver side active electrode 22D has two sides that are parallel to the first direction and positioned a predetermined distance away from each other in the second direction. Positions of these sides in the second direction do not coincide with each other. The power receiver side active electrode 22D has two parallel sides that cross the first direction and the second direction at predetermined angles so as to connect those two sides parallel to the first direction. Accordingly, the power receiver side active electrode 22D is formed into a parallelogram shape including a side parallel to the first side.

The two sides in the shape of the power receiver side active electrode 22D, which are parallel to the first direction, are longer than the two sides of the power transmitter side active electrode 12D parallel to the first direction. Furthermore, the two sides in the shape of the power receiver side active electrode 22D, which cross the first and second directions at some angles, are parallel to the two sides of the power transmitter side active electrode 12D, which cross the first and second directions at some angles, and furthermore shorter than the two sides of the power transmitter side active electrode 12D, which cross the first and second directions at some angles.

Even with the shapes described above, as are the case with the first embodiment and the case with the second embodiment, the decrease in power transmission efficiency may be prevented even when the power receiver device 20 is displaced on the surface of the power transmitter device 10 at least in one of the first direction and the second direction.

Figure 12:
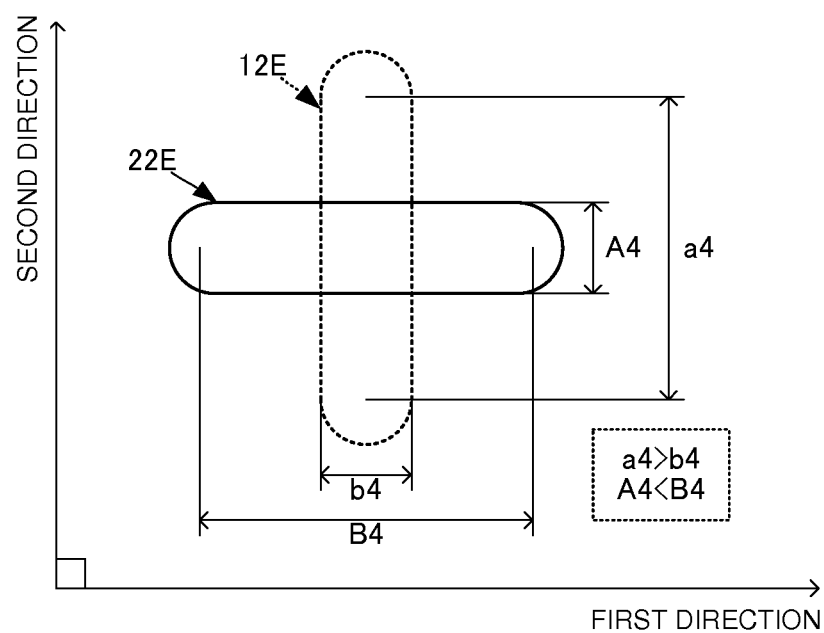
FIG. 12 is a diagram illustrating shapes of a power transmitter side active electrode and a power receiver side active electrode of a wireless power transmission system according to a fifth embodiment of the present invention.

Next, a wireless power transmission system according to a fifth embodiment is described with reference to the drawings. FIG. 12 is a diagram illustrating shapes of a power transmitter side active electrode and a power receiver side active electrode of the wireless power transmission system according to the fifth embodiment of the present invention.

The wireless power transmission system of the present embodiment is different from the wireless power transmission systems illustrated in the first and second embodiments in shape of a power transmitter side active electrode 12E and a power receiver side active electrode 22E. The remaining constituting elements are the same as those of the foregoing first and second embodiments, and illustrations and descriptions thereof are omitted.

The power transmitter side active electrode 12E and the power receiver side active electrode 22E are each an oval shape when viewed in the third direction.

The power transmitter side active electrode 12E has a shape in which a semicircular area is added to each of end portions in the second direction of the power transmitter side active electrode 12 illustrated in the first and second embodiments. With the shape described above, the length of the power transmitter side active electrode 12E in the second direction may be defined as a4 without the semicircular areas, and the foregoing condition may be satisfied. In other words, the length a4 of the power transmitter side active electrode 12E in the second direction may be longer than the length A4 of the power receiver side active electrode 22E in the second direction (a4>A4).

The power receiver side active electrode 22E has a shape in which a semicircular area is added to each of end portions in the first direction of the power receiver side active electrode 22 illustrated in the first and second embodiments. With the shape described above, the length of the power receiver side active electrode 22E in the first direction may be defined B4 without the semicircular areas, and the foregoing condition may be satisfied. In other words, the length B4 of the power receiver side active electrode 22E in the first direction may be longer than the length b4 of the power transmitter side active electrode 12E in the first direction (B4>b4).

Even with the configuration described above, the functions and effects similar to those of the foregoing first and second embodiments may be obtained. The area to be added is not limited to the semicircular shape, and may also be a polygon such as a triangle or the like, or a shape with curved sides such as oval.

Next, a wireless power transmission system according to a sixth embodiment of the present invention is described with reference to the drawings. FIG. 13 is a diagram illustrating shapes of a power transmitter side active electrode, a power transmitter side passive electrode, a power receiver side active electrode, and a power receiver side passive electrode of the wireless power transmission system according to the sixth embodiment of the present invention.

The wireless power transmission system of the present embodiment is different from the wireless power transmission system illustrated in the second embodiment in shape of a power transmitter side passive electrode 13F and a power receiver side passive electrode 23F. The remaining constituting elements are the same as those of the foregoing second embodiment, and illustrations and descriptions thereof are omitted.

The power transmitter side passive electrode 13F includes electrode segments 131, 132 arranged along the second direction with the power transmitter side active electrode 12 in between them. The electrode segments 131, 132 are each a rectangular shape longer in the first direction and shorter in the second direction. The power transmitter side passive electrode 13F includes electrode segments 133, 134 arranged along the first direction with the power transmitter side active electrode 12 in between them. The electrode segments 133, 134 are each a rectangular shape longer in the second direction and shorter in the first direction. The electrode segments 131, 132, 133, and 134 are connected to each other by connecting conductors 135 formed on a plane that is different from a plane on which these electrode segments and the power transmitter side active electrode 12 are formed. In the configuration described above, a distance between the electrode segments 131 and 132, which are separated from each other in the second direction, corresponds to the foregoing opening width c. Furthermore, a distance between the electrode segments 133 and 134, which are separated from each other in the first direction, corresponds to the foregoing opening width d.

The power receiver side passive electrode 23F includes electrode segments 231, 232 arranged along the second direction with the power receiver side active electrode 22 in between them. The electrode segments 231, 232 are each a rectangular shape longer in the first direction and shorter in the second direction. The power receiver side passive electrode 23F includes electrode segments 233, 234 arranged along the first direction with the power receiver side active electrode 22 in between them. The electrode segments 233, 234 are each a rectangular shape longer in the second direction and shorter in the first direction. The electrode segments 231, 232, 233, and 234 are connected to each other by connecting conductors 235 formed on a plane that is different from a plane on which these electrode segments and the power receiver side active electrode 12F are formed. In the configuration described above, a distance between the electrode segments 231 and 232, which are separated from each other in the second direction, corresponds to the foregoing opening width C. Furthermore, a distance between the electrode segments 233 and 234, which are separated from each other in the first direction, corresponds to the foregoing opening width D.

Even with the configuration described above, the functions and effects similar to those of the foregoing second embodiment may be obtained by satisfying dimensional relations similar to those of the second embodiment.

Figure 14:
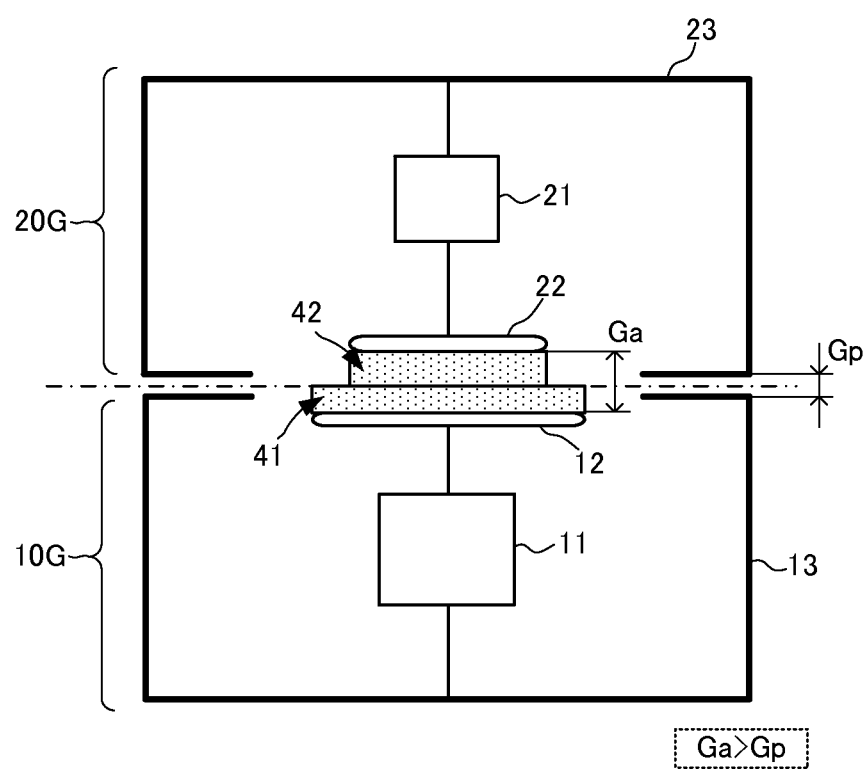
FIG. 14 is a diagram illustrating a basic configuration of a wireless power transmission system according to a seventh embodiment of the present invention, in which a distance between a power transmitter side active electrode and a power receiver side active electrode, and a distance between a power transmitter side passive electrode and a power receiver side passive electrode are indicated.

Next, a wireless power transmission system according to a seventh embodiment of the present invention is described with reference to the drawings. FIG. 14 is a diagram illustrating a basic configuration of the wireless power transmission system according to the seventh embodiment of the present invention, in which a distance between a power transmitter side active electrode and a power receiver side active electrode, and a distance between a power transmitter side passive electrode and a power receiver side passive electrode are indicated.

As illustrated in FIG. 14, in the wireless power transmission system according to the present embodiment, the distance (gap) Ga between the power transmitter side active electrode 12 and the power receiver side active electrode 22 is wider than the distance (gap) Gp between the power transmitter side passive electrode 13 and the power receiver side passive electrode 23.

As described above, a higher insulation level may be secured for the active electrodes by increasing the distance between the power receiver side active electrode 22 and the power transmitter side active electrode 12 at a high voltage. Furthermore, as illustrated in FIG. 14, a still higher insulation level may be secured for the active electrodes by arranging insulation films 41, 42 between the power transmitter side active electrode 12 and the power receiver side active electrode 22.

Each of the foregoing embodiments is described with the case where each active electrode has a shape that is longer in the first direction and shorter in the second direction, or a shape that is shorter in the first direction and longer in the second direction. Alternatively, one of the power transmitter side active electrode and the power receiver side active electrode may be formed into a square shape with the same length in the first direction and the second direction.

Furthermore, in each of the foregoing embodiments, the shapes of the power transmitter side active electrode and the power transmitter side passive electrode may be switched with the shapes of the power receiver side active electrode and the power receiver side passive electrode.

Furthermore, the shapes of the power transmitter side active electrode and the power transmitter side passive electrode described in each of the foregoing embodiments are some of examples according to the embodiments of the present invention. Other shapes may also be employed provided that the following requirement is satisfied. That is, any shape may be used as long as the overlapping area between the power transmitter side active electrode and the power receiver side active electrode does not change even when the spatial relationship between the power transmitter device and the power receiver device changes with the displacement in the first direction or the second direction in the placement receivable area 100.

REFERENCE SIGNS LIST

10 Power transmitter device
11 High-frequency high-voltage generator circuit
12, 12B, 12C, 12D, 12E Power transmitter side active electrode
13, 13A, 13F Power transmitter side passive electrode
20 Power receiver device
21 High-frequency high-voltage load circuit
22, 22B, 22C, 22D, 22E Power receiver side active electrode
23, 23A, 23F Power receiver side passive electrode
41, 42 Insulation film
100 Placement receivable area
131, 132, 133, 134, 231, 232, 233, 234 Electrode segment

The invention claimed is:

1. A wireless power transmission system comprising:
a power transmitter device including:
   a planar outer surface having a power transmitter receiving region with a first cross-sectional area,
   an AC generator circuit,
   a power transmitter side active electrode coupled to the AC generator circuit and having a width (b) extending in a first direction and a length (a) extending in a second direction orthogonal to the first direction, where (a)>(b), and
   a power transmitter side passive electrode coupled to the AC generator circuit; and
a power receiver device including:
   a housing having a second cross-sectional area less than the first cross-sectional area of the power transmitter device,
   a load circuit,
   a power receiver side passive electrode coupled to the load circuit, and
   a power receiver side active electrode coupled to the load circuit and having a width (A) extending in the second direction and a length (B) extending in the first direction, where (A)<(B),
wherein, when the power receiver device is positioned on the planar outer surface within the power transmitter receiving region, the power transmitter side active electrode overlaps the power receiver side active electrode at an overlapping region that has a constant area independent of the position of the power receiver device in the power receiving region, and
wherein (a)>(A) and (b)<(B).

2. The wireless power transmission system according to claim 1, wherein the power transmitter device is configured to transmit electrical power to the power receiver device when the power receiver device is positioned on the planar outer surface of the power transmitter device.

3. The wireless power transmission system according to claim 1, wherein the power transmitter receiving region comprises a rectangular cross-sectional area with a first length (L1) extending in the first direction and a second length (L2) extending in the second direction.

4. The wireless power transmission system according to claim 3, wherein the housing of the power receiver device has a rectangular cross-sectional area with a third length (L3) and a fourth length (L4), wherein the third length (L3) is less than the first length (L1) of the rectangular cross-sectional area of the power transmitter receiving region, and wherein the fourth length (L4) is less than the second length (L2) of the rectangular cross-sectional area of the power transmitter receiving region.

5. The wireless power transmission system according to claim 4, wherein, when the power receiver device is positioned on the planar outer surface within the power transmitter receiving region of the power transmitter device, the first length (L1) minus the third length (L3)=ΔL1, which is a displacement length in the first direction of the power receiver device in which an area of the overlapping region remains constant.

6. The wireless power transmission system according to claim 4, wherein, when the power receiver device is positioned on the planar outer surface within the power transmitter receiving region of the power transmitter device, the second length (L2) minus the fourth length (L4)=ΔL2, which is a displacement length in the second direction of the power receiver device in which an area of the overlapping region remains constant.

7. The wireless power transmission system according to claim 1, wherein the power transmitter side active electrode comprises a rectangular shape.

8. The wireless power transmission system according to claim 7, wherein the power transmitter side passive electrode is rectangular shaped and extends parallel and adjacent to the power transmitter receiving region.

9. The wireless power transmission system according to claim 8, wherein the power transmitter side active electrode is disposed within the power transmitter side passive electrode, with a pair of first gaps between both sides of the power transmitter side active electrode and respective sides of the power transmitter side passive electrode extending in the second direction, and with a pair of second gaps between both ends of the power transmitter side active electrode and respective ends of the power transmitter side passive electrode extending in the first direction.

10. The wireless power transmission system according to claim 9, wherein the power receiver side passive electrode is disposed within the power receiver device, with a pair of third gaps between both sides of the power receiver side active electrode and respective sides of the power receiver side passive electrode extending in the second direction, and with a pair of fourth gaps between both ends of the power receiver side active electrode and respective ends of the power receiver side passive electrode extending in the first direction.

11. The wireless power transmission system according to claim 10, wherein, when the power receiver device is positioned on the planar outer surface within the power transmitter receiving region of the power transmitter device, the power transmitter side passive electrode and the power receiver side passive electrode overlap at at least a portion of each other thereof, such that $$(b)<(B)<((b)+(d))/2 \text{ and } (A)<(a)<((A)+(C))/2, \text{ or}$$

$$(B)<(b)<((B)+(D))/2 \text{ and } (a)<(A)<((a)+(c))/2, \text{ and}$$

where d is a gap length in the second direction of one of the passive electrodes corresponding to one of the power transmitter side active electrode and the power receiver side active electrode, (c) is a gap length thereof in the first direction, (D) is a gap length in the second direction of the other of the passive electrodes corresponding to the other active electrode, and (C) is a gap length thereof in the first direction.

12. A wireless power transmission system comprising:
a power transmitter device including:
a planar outer surface having a power transmitter receiving region with a first cross-sectional area,
an AC generator circuit,
a power transmitter side active electrode coupled to the AC generator circuit, and
a power transmitter side passive electrode coupled to the AC generator circuit; and
a power receiver device including:
a housing having a second cross-sectional area less than the first cross-sectional area of the power transmitter device,
a load circuit,
a power receiver side passive electrode coupled to the load circuit, and
a power receiver side active electrode coupled to the load circuit,
wherein, when the power receiver device is positioned on the planar outer surface within the power transmitter receiving region, the power transmitter side active electrode overlaps the power receiver side active electrode at an overlapping region that has a constant area independent of the position of the power receiver device in the power receiving region,
wherein the power transmitter side passive electrode is disposed in the power transmitter device with gaps on both sides of the power transmitter side active electrode extending in a first direction and on both ends thereof extending in a second direction orthogonal to the first direction,
wherein the power receiver side passive electrode is disposed in the power receiver device with gaps on both sides of the power receiver side active electrode extending in the first direction and on both ends thereof extending in the second direction, and
wherein, when the power receiver device is positioned on the planar outer surface within the power transmitter receiving region of the power transmitter device, the power transmitter side passive electrode and the power receiver side passive electrode overlap at least a portion of each other.

13. The wireless power transmission system according to claim 12, wherein the gap between the power transmitter side active electrode and the power receiver side active electrode has a width different than a width of the gap between the power transmitter side passive electrode and the power receiver side passive electrode.

14. The wireless power transmission system according to claim 12, wherein the gap between the power transmitter side active electrode and the power receiver side active electrode has a length longer than a length of the gap between the power transmitter side passive electrode and the power receiver side passive electrode.

15. A wireless power transmitter device for transmitting electric power to a power receiver device having a housing with a first cross-sectional area and a power receiver side active electrode disposed therein having a length (B) extending in a first direction and width (A) extending in a second direction orthogonal to the first direction, where (A)<(B), the power transmitter device comprising:

a planar outer surface having a power transmitter receiving region with a second cross-sectional area greater than the first cross-sectional area of the power receiver device;

an AC generator circuit;

a power transmitter side active electrode coupled to the AC generator circuit and having a width (b) extending in the first direction and a length (a) extending in the second direction where (a)>(b), (a)>(A) and (b)<(B); and a power transmitter side passive electrode coupled to the AC generator circuit, wherein, when the power receiver device is positioned on the planar outer surface within the power transmitter receiving region, the power transmitter side active electrode overlaps the power receiver side active electrode at an overlapping region that has a constant area independent of the position of the power receiver device in the power receiving region.

16. The wireless power transmitter device according to claim 15, wherein the power transmitter device is configured to transmit electrical power to the power receiver device when the power receiver device is positioned on the planar outer surface of the power transmitter device.

17. The wireless power transmitter device according to claim 15, wherein the power transmitter receiving region comprises a rectangular cross-sectional area with a first length (L1) extending in the first direction and a second length (L2) extending in the second direction.

18. The wireless power transmitter device according to claim 17, wherein the power transmitter side active electrode comprises a rectangular shape having a length that extends in a direction parallel to the second direction (L2) and a width that extends in a direction parallel to the first direction (L1).

19. The wireless power transmitter device according to claim 17, wherein the power transmitter side active electrode is disposed within the power transmitter side passive electrode, with a pair of first gaps between both sides of the power transmitter side active electrode and respective sides of the power transmitter side passive electrode extending in the second direction, and with a pair of second gaps between both ends of the power transmitter side active electrode and respective ends of the power transmitter side passive electrode extending in the first direction.

* * * * *